July 10, 1928.

J. EATON

BRAKE

Filed April 1, 1927

1,677,024

Inventor:
John Eaton
by
His Attorney

Patented July 10, 1928.

1,677,024

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

BRAKE.

Application filed April 1, 1927. Serial No. 180,287.

This invention relates to brakes, particularly friction brakes of the normally applied and electromagnetically released type, and the principal object of the invention is to insure a smooth application of the brake.

In the ordinary form of electromagnetic brake, such for example as used in elevator or hoisting service, the brake is provided with suitable springs for biasing the friction shoes into engagement with the rotatable braking drum when the brake releasing electromagnet is deenergized. When the effective pressure of the brake applying springs is made sufficiently strong to insure that the elevator or hoisting load is held securely at rest there is always a tendency for the brake to grab or snub just prior to bringing the load to rest. When dash pots or other forms of retarding devices are employed in an endeavor to obtain a gradually increasing spring pressure, there is a tendency for the brake to grab or snub in case an excessive spring pressure is applied before the load is brought to rest.

With the improvements of the present invention the grabbing or snubbing tendency of the brakes are effectively overcome and at the same time ample braking effect obtained to insure that the load is quickly brought to and maintained at rest.

Briefly, this is accomplished by means of an improved brake applying lever mechanism arranged so that the effective pressure of the brake applying springs is decreased after the initial application of the brake. This provides a gradually decreasing braking effect that is just sufficient to bring the load to rest smoothly and without appreciable grabbing or snubbing. With the load brought to rest the brake applying lever mechanism then functions to increase the effective pressure of the brake applying springs to the full value so as to securely hold the load.

In the preferred embodiment of the invention described hereinafter the operation of the brake applying lever mechanism is controlled automatically through the agency of the brake releasing electromagnet. This is accomplished by connecting a suitable resistance across the terminals of the electromagnet to delay the movement of the movable magnetic members controlled thereby upon deenergization of the electromagnet. In this way the lever mechanism is automatically controlled by the retarded movement of the magnetic members so as to vary the effective pressure of the brake applying springs in the manner outlined above.

Figure 1:
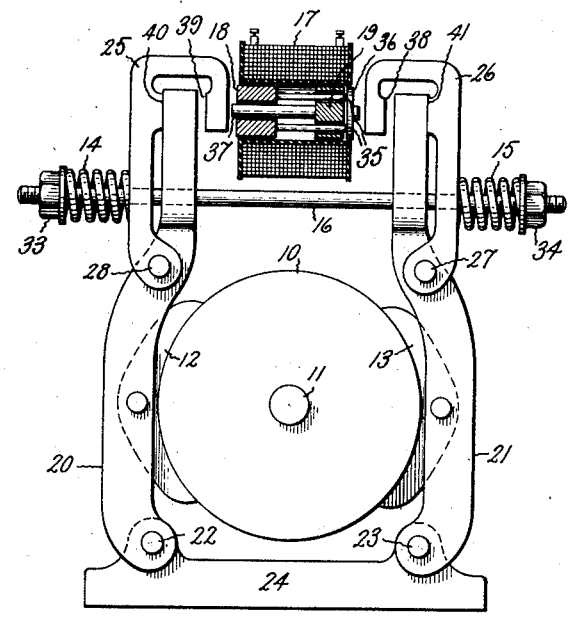
Figure 2:
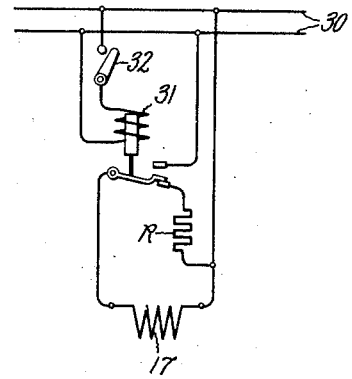
Figure 3:
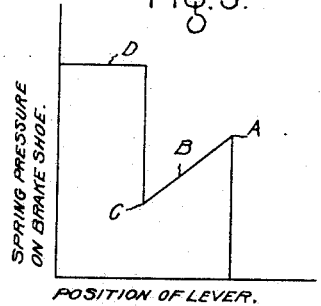

Fig. 1 of the accompanying drawing illustrates a preferred structural arrangement of an electromagnetic brake embodying the improvements of the present invention, Fig. 2 is a simplified circuit diagram showing the electrical connections for the brake releasing electromagnet, and Fig. 3 is a diagram showing schematically the variation of the effective pressure of the brake applying springs during the application of the brakes.

In the brake structure illustrated in Fig. 1, the braking drum 10 is mounted upon the shaft 11 which may be connected either directly or through suitable gearing to an elevator, hoist or other apparatus. The oppositely disposed brake shoes 12 and 13 are biased into braking engagement with the drum 10 by means of the brake applying springs 14 and 15 which are mounted at the ends of the interconnecting tension rod 16. The electromagnet 17 having the oppositely acting movable magnetic members 18 and 19 serves to oppose the strain of the biasing springs 14 and 15 and thereby effect the release of the brake shoes 12 and 13 from the braking drum 10.

The lever mechanism through which the biasing springs 14 and 15 as well as the releasing electromagnet 17 operates to control the application and release of the brake shoes 12 and 13 comprises the two main lever arms 20 and 21 which are mounted respectively upon the pivots 22 and 23 carried by the base 24. The auxiliary lever arms 25 and 26 are pivotally mounted at the upper end of the main lever arms 21 and 20 upon the pivot pins 27 and 28 respectively. Each of the auxiliary lever arms 25 and 26 is formed at its upper end in the shape of a yoke straddling the end of the corresponding main lever arm.

As illustrated in Fig. 2 the operating winding of the brake releasing electromagnet 17 may be arranged to be energized from suitable supply lines 30 under the control of the double throw electromagnetic switch 31. The operation of switch 31 is controlled by a suitable master switch 32 which may be operated in any suitable manner. The electromagnetic switch 31 is normally biased to connect the discharge resistor R across the terminals of the operating winding of electromagnet 17 immediately upon interruption of the energizing circuit for the winding 17. The connection of the resistor R across the terminals of the releasing magnet 17 operates in a well-known manner to delay the collapse of the electromagnetic field of the electromagnet and thereby retard the release of the magnetic members 18 and 19.

With the arrangement just described the operation of the brake is as follows: When the electromagnet 17 is de-energized, the brake applying springs 14 and 15 exert pressure upon the main levers 20 and 21 through the auxiliary levers 25 and 26 and thereby serve to bias the brake shoes 12 and 13 into engagement with the braking drum 10. The value of the pressure exerted by the brake applying springs 14 and 15 may be adjusted as desired by loosening or tightening the adjusting nuts 33 and 34 on the ends of the bar 16. In this way a sufficiently strong pressure of the brake applying springs may be obtained for effectively insuring that the braking drum 10 is securely maintained at rest.

Upon closure of the master switch 32 and the resulting operation of the electromagnetic switch 31 to connect the operating winding of the brake releasing electromagnet 17 to the supply lines 30, the electromagnetic member 18 is attracted and operates through the push rods 35 and the connecting head 36 to move the auxiliary lever 26 against the strain of the biasing spring 15. At the same time the movable member 19 of the releasing electromagnet operates through the push rod 37 to move the auxiliary lever 25 against the strain of the biasing spring 14.

Initially the outward movement of the auxiliary lever 26 produces rotation thereof about the pivot pin 27 until the stop 38 of the yoked end of the lever 26 engages with the end of the main lever 21. Thereupon the auxiliary lever 26 and the main lever 21 move as a unit about the pivot 23 on the base 24. Likewise the initial outward movement of the auxiliary lever 25 occurs about the pivot 28 until the stop 39 of the yoked end of the lever 25 engages with the end of the main lever 20. The auxiliary lever 25 and the main lever 20 thereupon move as a unit about the pivotal mounting 22 upon the base 24.

As the main brake levers 20 and 21 move apart the brake shoes 12 and 13 are released thereby permitting free rotation of the brake drum 10.

To apply the brake, the master switch 32 is opened to de-energize the electromagnetic switch 31. As a result the operating winding of the brake releasing electromagnet 17 is disconnected from the supply line 30 and connected in circuit with the resistor R. As previously pointed out this prevents instantaneous collapse of the magnetic field and consequently maintains the attractive force upon the magnetic members 18 and 19. As this attractive force gradually decreases, the springs 14 and 15 move the main levers 20 and 21 together with the auxiliary levers 25 and 26 as units to carry the brake shoes 12 and 13 into braking engagement with the drum 10. As long as the attractive force upon the magnetic members 18 and 19 is sufficient to maintain the stops 38 and 39 of the auxiliary levers 25 and 26 in engagement with the ends of the corresponding main levers 20 and 21, the brake applying springs 14 and 15 operate through a compound leverage including both the main levers and the auxiliary levers. Consequently the effective pressure exerted upon the brake shoes 12 and 13 depends upon both the compound leverage and the degree of compression of the brake applying springs 14 and 15 and may have a value such as shown at A in the brake pressure diagram of Fig. 3. Upon further decrease in the magnetic attractive force, the auxiliary levers 25 and 26 pivot about the pins 27 and 28 thus carrying stops 40 and 41 on the auxiliary levers toward the end of the main levers 20 and 21 and consequently carrying the stops 38 and 39 away from the end of the main levers. During this movement of the auxiliary levers the compression of the brake applying springs 14 and 15 is decreased without, however, decreasing the compound leverage through which the springs operate to exert pressure upon the brake shoes 12 and 13. Hence as the compression of the springs 14 and 15 is decreased there is a corresponding decrease in the pressure applied to the brake shoes 12 and 13 as shown by the sloping line AC in Fig. 3. This results in a corresponding decrease in the braking action exerted upon the drum 10. With the tension of the brake applying springs 14 and 15 properly adjusted and the compound lever system properly proportioned, the braking action of the brake shoes 12 and 13 upon the braking drum 10 corresponding to some intermediate point on the line AC as for example B in Fig. 3 may be made just sufficient to bring the load to rest with a given torque on the shaft 11. With the load brought to rest at this point there is no tendency for the brake shoes 12 and 13 to grab or snub and thereby abruptly stop rotation of the brake drum 10 since the pressure on the brake shoes is decreasing. As the stationary coefficient of friction of the brake shoes is always greater than the running coefficient of friction, the drum 10 is held at rest even though the pressure on the brake shoes decrease to the value indicated at C in Fig. 3.

In order, however, to insure that the brake drum 10 is securely maintained at rest, the pressure exerted on the brake shoes 12 and 13 through the lever mechanism is automatically increased when the stops 40 and 41 of the auxiliary levers 25 and 26 finally engage with the ends of the main levers 20 and 21. When this occurs the compound lever action ceases and the full pressure of the brake applying springs 14 and 15 is applied to the main levers 20 and 21 without any compounding action. Consequently the pressure exerted upon the brake shoes 12 and 13 when there is no further attractive force on the magnetic members 18 and 19 is increased to the value indicated at D in the brake pressure diagram of Fig. 3.

While I have described a preferred embodiment of the invention, it will be understood that the apparatus shown may be modified without departing from the true spirit and scope of the invention.

What I claim as new and desire to secure by Letters Patent of the United States, is:—

1. A brake comprising relatively movable friction members, and a spring biased mechanism including a member movable between two positions for automatically effecting braking engagement of said friction members with the effective force of the biasing spring reduced in value below its effective force at either of said two positions when the said member is intermediate said positions.

2. A brake comprising relatively movable friction members, a biasing spring for effecting braking engagement of said friction members, and a movable lever mechanism for controlling the effective force of the biasing spring so as to reduce the braking effect of the friction members after they are brought into engagement to a minimum at an intermediate position of the lever mechanism during movement thereof between two positions.

3. A brake comprising relatively movable friction members, a biasing spring for effecting braking engagement of said members, and means operably connecting the biasing spring with the friction members including a main lever and an auxiliary lever pivotally mounted upon the main lever for reducing the braking effect of the friction members during movement of the auxiliary lever between two positions.

4. A brake comprising relatively movable friction members, a biasing spring for effecting engagement of said members, and means operably connecting the spring with one of the friction members comprising a main lever and an auxiliary lever pivotally mounted upon the main lever and operable between two positions for reducing the force exerted by the biasing spring upon the main lever during movement of the auxiliary lever between said positions.

5. An electromagnetic brake comprising relatively movable friction members, and an electrically controlled spring biasing mechanism for effecting braking engagement of the friction members with a decreased pressure to a minimum between the initial and final engagement thereof.

6. An electromagnetic brake comprising relatively movable friction members, a spring for biasing the members into braking engagement, and electrically controlled means for reducing the braking effect of the members to a minimum between the initial and final engagement thereof.

7. An electromagnetic brake comprising relatively movable friction members, a spring for biasing said members into braking engagement, an electromagnet for opposing the spring to release the friction members, and mechanical connections between the spring and the electromagnet for reducing the effective force of the spring after the initial engagement of the friction members.

8. An electromagnetic brake comprising relatively movable friction members, a spring operably connected with one of the members for biasing the same into braking engagement with the other member, an electromagnet for opposing the spring, and connections between the spring and the electromagnet including a member controlled by the electromagnet and movable between two positions and arranged to reduce the force of the spring for biasing the friction members into engagement when said member is intermediate said positions.

9. An electromagnetic brake comprising cooperating friction members, a spring for biasing the members into braking engagement, a compound lever mechanism interconnecting the spring and one of the friction members, and an electromagnet arranged to operate upon said lever mechanism to oppose the spring upon energization of the electromagnet and thereby release the braking members and to decrease the force with which the spring operates during engagement of the braking member upon deenergization of the electromagnet.

10. An electromagnetic brake comprising a brake drum, a friction brake shoe, a spring for biasing the brake shoe into braking engagement with the brake drum, a compound lever mechanism interconnecting the spring with the brake shoe, and an electromagnet having a movable magnetic member for operating the lever mechanism to oppose the strain of the biasing spring upon energization of the electromagnet and to vary the force of the spring effective to apply the brake shoe upon deenergization of the electromagnet.

11. An electromagnetic brake comprising a brake drum, a brake shoe, a spring for biasing the shoe into engagement with the drum, a compound lever mechanism connecting the spring with the brake shoe and having relatively movable lever arms, and an electromagnet having a movable magnetic member for moving the lever mechanism to oppose the strain of the biasing spring upon energization of the electromagnet and for controlling relative movement between the lever arms to vary the force exerted by the spring upon the brake shoe upon deenergization of the electromagnet.

12. An electromagnetic brake comprising a brake drum, a pair of oppositely disposed brake shoes cooperating with the drum, a pair of compression springs for biasing the brake shoes into braking engagement with the drum, a compound lever mechanism connecting each biasing spring with a corresponding one of the brake shoes and having relatively movable lever arms, and an electromagnet having a pair of oppositely acting movable magnetic members, each cooperating with a corresponding one of the lever mechanisms to oppose the strain of the biasing spring associated therewith upon energization of the electromagnet and for controlling relative movement between the lever arms to vary the force exerted by the springs upon the corresponding brake shoe upon deenergization of the electromagnet.

In witness whereof, I have hereunto set my hand this 31st day of March, 1927.

JOHN EATON.